United States Patent
Kutz et al.

(10) Patent No.: US 12,273,165 B2
(45) Date of Patent: Apr. 8, 2025

(54) SPACE TIME CODING FOR SIDELINK TRANSMISSIONS

(71) Applicant: QUALCOMM Incorporated, San Diego, CA (US)

(72) Inventors: Gideon Shlomo Kutz, Ramat Hasharon (IL); Tal Oved, Modiin (IL); Amit Bar-Or Tillinger, Tel-Aviv (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/065,618

(22) Filed: Dec. 13, 2022

(65) Prior Publication Data
US 2024/0195463 A1    Jun. 13, 2024

(51) Int. Cl.
*H04B 7/0456*    (2017.01)
*H04W 92/18*    (2009.01)

(52) U.S. Cl.
CPC ........... *H04B 7/0456* (2013.01); *H04W 92/18* (2013.01)

(58) Field of Classification Search
CPC .............................. H04B 7/0456; H04W 92/18
See application file for complete search history.

(56) References Cited

U.S. PATENT DOCUMENTS

| | | |
|---|---|---|
| 2014/0105319 A1 | 4/2014 | Lee et al. |
| 2019/0028158 A1* | 1/2019 | Park .................... H04B 7/0479 |
| 2021/0051653 A1 | 2/2021 | Park et al. |
| 2022/0330209 A1* | 10/2022 | Ding .................... H04W 28/12 |
| 2022/0368387 A1 | 11/2022 | Kutz et al. |
| 2023/0362895 A1* | 11/2023 | Su .......................... H04W 4/46 |
| 2024/0064857 A1* | 2/2024 | Wang .................... H04W 76/10 |

FOREIGN PATENT DOCUMENTS

WO    WO-2008096308 A1    8/2008

OTHER PUBLICATIONS

International Search Report and Written Opinion—PCT/US2023/079672—ISA/EPO—Mar. 14, 2024.
You D., et al., "Hybrid STBC-SM Suitable for Multi-link Device-to-Device Communication in Cellular Networks", Wireless Personal Communications, Springer, Dordrecht, NL, vol. 96, No. 1, May 6, 2017, pp. 1507-1518, XP036302642, the whole document.
Zhang H., et al., "Performance Analysis of MIMO-HARQ Assisted V2V Communications With Keyhole Effect", IEEE Transactions On Communications, vol. 70, No. 5, May 2022, pp. 3034-3045.

* cited by examiner

*Primary Examiner* — Janice N Tieu
(74) *Attorney, Agent, or Firm* — Holland & Hart/QUALCOMM Incorporated

(57) ABSTRACT

The described techniques may support multi-rank sidelink communications that may be reduced to single rank communications if failure to decode the multi-rank sidelink communications occurs. A user equipment (UE) may transmit a first message including first data using a first precoding vector applied for a first layer and a second precoding vector applied for a second layer. If the first message is not decoded successfully, the UE may transmit a second message including second data using a third precoding vector applied for the first layer and a fourth precoding vector applied for the second layer, where the second data is derived from the first data, the third precoding vector is derived from the second precoding vector, and the fourth precoding vector is derived from the first precoding vector. The second message may effectively reduce a rank of the first message when the channel is rank deficient.

30 Claims, 11 Drawing Sheets

SPACE TIME CODING FOR SIDELINK TRANSMISSIONS

FIELD OF TECHNOLOGY

The following relates to wireless communications, including encoding and decoding for sidelink transmissions.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support space time coding for sidelink transmissions. For example, the described techniques provide for a user equipment (UE) to support multi-rank sidelink communications that may be reduced to single rank communications if failure to decode the multi-rank sidelink communications occurs. For instance, a first user equipment (UE) may transmit a first sidelink message including a first set of data symbols using a first precoding vector applied for a first layer and a second precoding vector applied for a second layer. The second UE may transmit an indication that the first sidelink transmission was not decoded successfully and the first UE may transmit a second sidelink message including a second set of data symbols using a third precoding vector applied for the first layer and a fourth precoding vector applied for the second layer based on receiving the indication that first sidelink transmission was not decoded successfully, where the second set of data symbols are derived from the first set of data symbols, and where the third precoding vector is derived from the second precoding vector and the fourth precoding vector is derived from the first precoding vector.

A method for wireless communication is described. The method may include transmitting a first sidelink message including a first set of data symbols using a first precoding vector applied for a first layer and a second precoding vector applied for a second layer, receiving an indication that the first sidelink message was not decoded successfully, and transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

An apparatus for wireless communication is described. The apparatus may include a processor, memory coupled with the processor, and instructions stored in the memory. The instructions may be executable by the processor to cause the apparatus to transmit a first sidelink message including a first set of data symbols using a first precoding vector applied for a first layer and a second precoding vector applied for a second layer, receive an indication that the first sidelink message was not decoded successfully, and transmit a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

Another apparatus for wireless communication is described. The apparatus may include means for transmitting a first sidelink message including a first set of data symbols using a first precoding vector applied for a first layer and a second precoding vector applied for a second layer, means for receiving an indication that the first sidelink message was not decoded successfully, and means for transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

A non-transitory computer-readable medium storing code for wireless communication is described. The code may include instructions executable by a processor to transmit a first sidelink message including a first set of data symbols using a first precoding vector applied for a first layer and a second precoding vector applied for a second layer, receive an indication that the first sidelink message was not decoded successfully, and transmit a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

Some examples of the method, apparatuses, and non-transitory computer-readable medium described herein may further include operations, features, means, or instructions for receiving capability information from a wireless device, where using the third precoding vector and the fourth precoding vector for the second sidelink message may be based on receiving the capability information.

In some examples of the method, apparatuses, and non-transitory computer-readable medium described herein, the capability information includes an indication of whether the wireless device supports multiple input multiple output (MIMO) and using the third precoding vector and the fourth precoding vector for the second sidelink message may be based on whether the device supports MIMO.

Some examples of the method, apparatuses, and non-transitory computer-readable medium described herein may further include operations, features, means, or instructions for transmitting a third sidelink message including the first set of data symbols using a fifth precoding vector applied for the first layer and a sixth precoding vector applied for the second layer and transmitting a fourth sidelink message including the second set of data symbols using a seventh precoding vector applied for the first layer and an eighth precoding vector applied for the second layer, where the seventh precoding vector may be derived from the sixth precoding vector and the eighth precoding vector may be derived from the fifth precoding vector, and where the first sidelink message and the second sidelink message may be associated with a first incremental redundancy version and the third sidelink message and the fourth sidelink message may be associated with a second incremental redundancy version.

In some examples of the method, apparatuses, and non-transitory computer-readable medium described herein, the third precoding vector may be derived based on inverting a sign of the second precoding vector and conjugating the second precoding vector with the inverted sign and the fourth precoding vector may be derived based on conjugating the first precoding vector.

In some examples of the method, apparatuses, and non-transitory computer-readable medium described herein, the second set of data symbols may be obtained by conjugating the first set of data symbols.

In some examples of the method, apparatuses, and non-transitory computer-readable medium described herein, the first sidelink message and the second sidelink message may be associated with cellular vehicle to everything (CV2X) communications.

A method for wireless communication is described. The method may include monitoring for a first sidelink message including a first set of data symbols using a first precoding vector applied for a first layer and a second precoding vector applied for a second layer, transmitting an indication that the first sidelink message was not decoded successfully, and receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

An apparatus for wireless communication is described. The apparatus may include a processor, memory coupled with the processor, and instructions stored in the memory. The instructions may be executable by the processor to cause the apparatus to monitor for a first sidelink message including a first set of data symbols using a first precoding vector applied for a first layer and a second precoding vector applied for a second layer, transmit an indication that the first sidelink message was not decoded successfully, and receive a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

Another apparatus for wireless communication is described. The apparatus may include means for monitoring for a first sidelink message including a first set of data symbols using a first precoding vector applied for a first layer and a second precoding vector applied for a second layer, means for transmitting an indication that the first sidelink message was not decoded successfully, and means for receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

A non-transitory computer-readable medium storing code for wireless communication is described. The code may include instructions executable by a processor to monitor for a first sidelink message including a first set of data symbols using a first precoding vector applied for a first layer and a second precoding vector applied for a second layer, transmit an indication that the first sidelink message was not decoded successfully, and receive a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

Some examples of the method, apparatuses, and non-transitory computer-readable medium described herein may further include operations, features, means, or instructions for transmitting capability information to a wireless device, where receiving the second sidelink message including the second set of data symbols using a third precoding vector applied for the first layer and a fourth precoding vector applied for the second layer may be based on transmitting the capability information.

In some examples of the method, apparatuses, and non-transitory computer-readable medium described herein, the capability information includes an indication of whether the wireless device supports multiple input multiple output (MIMO) and receiving the second sidelink message including the second set of data symbols using a third precoding vector applied for the first layer and a fourth precoding vector applied for the second layer may be based on whether the device supports MIMO.

In some examples of the method, apparatuses, and non-transitory computer-readable medium described herein, the first sidelink message may have a rank of 2 and the method, apparatuses, and non-transitory computer-readable medium may include further operations, features, means, or instructions for applying a channel matrix to the first sidelink message that reduces a rank of the first sidelink message to a rank of 1 to decode the second sidelink message.

In some examples of the method, apparatuses, and non-transitory computer-readable medium described herein, the third precoding vector may be derived based on inverting a sign of the second precoding vector and conjugating the second precoding vector with the inverted sign and the fourth precoding vector may be derived based on conjugating the first precoding vector.

In some examples of the method, apparatuses, and non-transitory computer-readable medium described herein, the second set of data symbols may be obtained by conjugating the first set of data symbols.

In some examples of the method, apparatuses, and non-transitory computer-readable medium described herein, the first sidelink message and the second sidelink message may be associated with cellular vehicle to everything (CV2X) communications.

DETAILED DESCRIPTION

In some examples, multi-rank sidelink communications (e.g., sidelink communications associated with a rank greater than 1 such as multiple-input multiple-output (MIMO) communications) may be performed. However, as mobility associated with wireless devices increases (e.g., in cellular vehicle to everything (CV2X) communications) and/or in certain communication schemes (e.g., point to multipoint communications schemes), failure to accurately determine the channel rank may occur more frequently as compared to communications schemes with limited mobility and/or other communication schemes (e.g., point to point communications schemes). Failure to accurately determine rank may decrease an effectiveness of MIMO techniques. However, refraining from performing MIMO techniques (e.g., performing single input and/or single output communications) may result in decreased spectral efficiency.

To support multi-rank sidelink communications such that average spectral efficiency is increased, a first user equipment (UE) may transmit a first sidelink message with a first set of data symbols using a first precoding vector applied for a first layer and a second precoding vector applied for a second layer. If a second UE fails to decode the first sidelink message, the second UE may transmit a negative acknowledgement (NACK) to the first UE to indicate that the second UE failed to decode the first sidelink message. After receiving the NACK (or if the first UE fails to receive an acknowledgement (ACK) or another sidelink message from the second UE), the first UE may transmit a second sidelink message using space-time coding. For instance, the second sidelink message may include a second set of data symbols using a third precoding vector applied for the first layer and a fourth precoding vector applied for the second layer. In some such examples, the second set of data symbols may be derived from the first set of data symbols (e.g., the second set of data symbols may be obtained by conjugating the first set of data symbols). Additionally or alternatively, the third precoding vector may be derived from the second precoding vector and/or the fourth precoding vector may be derived from the first precoding vector. For instance, the third precoding vector may be derived based on inverting a sign of the second precoding vector and conjugating the inverted second precoding vector and/or the fourth precoding vector may be derived based on conjugating the first precoding vector.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to space time coding for sidelink transmissions.

Figure 1:
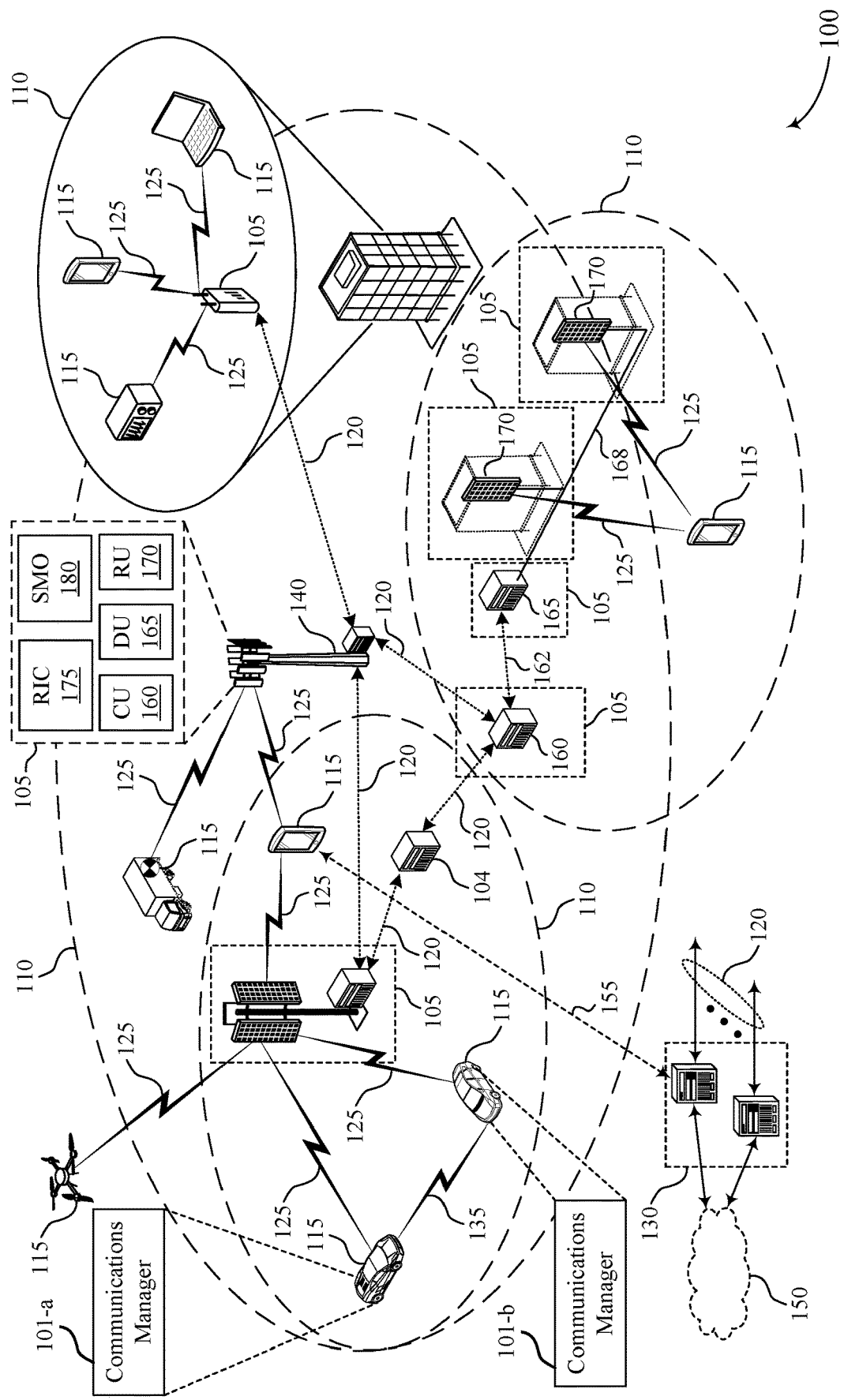
FIG. 1 illustrates an example of a wireless communications system that supports space time coding for sidelink transmissions in accordance with one or more aspects of the present disclosure.

FIG. 1 illustrates an example of a wireless communications system 100 that supports space time coding for sidelink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support space time coding for sidelink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($0f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, multi-rank sidelink communications (e.g., sidelink communications associated with a rank greater than 2, such as multiple-input multiple-output (MIMO) communications) may be performed. However, as mobility associated with wireless devices increases (e.g., in cellular vehicle to everything (CV2X) communications) and/or in certain communication schemes (e.g., point to multipoint communications schemes), failure to accurately determine the channel rank may occur more frequently as compared to communications schemes with decreased mobility and/or other communication schemes (e.g., point to point communications schemes). Failure to accurately determine rank may decrease an effectiveness of MIMO. However, refraining from performing MIMO (e.g., performing single input and/or single output communications) may result in decreased spectral efficiency.

To support multi-rank sidelink communications in at least some cases, a first user equipment (UE) 115 may transmit a first sidelink message with a first set of data symbols using a first precoding vector applied for a first layer and a second precoding vector applied for a second layer. If a second UE 115 fails to decode the first sidelink message, the second UE 115 may transmit a NACK to the first UE 115 to indicate that the second UE 115 failed to decode the first sidelink message. After receiving the NACK (or if the first UE 115 fails to receive an ACK or another sidelink message from the second UE 115), the first UE 115 may transmit a second sidelink message using space-time coding. For instance, the second sidelink message may include a second set of data symbols using a third precoding vector applied for the first layer and a fourth precoding vector applied for the second layer. In some such examples, the second set of data symbols may be derived from the first set of data symbols (e.g., the second set of data symbols may be obtained by conjugating the first set of data symbols). Additionally or alternatively, the third precoding vector may be derived from the second precoding vector and/or the fourth precoding vector may be derived from the first precoding vector. For instance, the third precoding vector may be derived based on inverting a sign of the second precoding vector and conjugating the inverted second precoding vector and/or the fourth precoding vector may be derived based on conjugating the first precoding vector.

In some examples, a UE 115 may include communications manager 101-a. Communications manager 101-a may be configured to transmit a first sidelink message including a first set of data symbols using a first precoding vector applied for a first layer and a second precoding vector applied for a second layer. Additionally, communications manager 101-a may be configured to receive an indication that the first sidelink message was not decoded successfully. Additionally, communications manager 101-a may transmit a second sidelink message including a second set of data symbols using a third precoding vector applied for the first layer and a fourth precoding vector applied for the second layer based on the indication that the first sidelink message was not decoded successfully, where the second set of data symbols are derived from the first set of data symbols, and where the third precoding vector is derived from the second precoding vector and the fourth precoding vector is derived from the first precoding vector.

In some examples, a UE 115 may include communications manager 101-b. Communications manager 101-b may be configured to monitor for a first sidelink message including a first set of data symbols using a first precoding vector applied for a first layer and a second precoding vector applied for a second layer. Communications manager 101-b may transmit an indication that the first sidelink message was not decoded successfully. Communications manager 101-b may receive a second sidelink message including a second set of data symbols using a third precoding vector applied for the first layer and a fourth precoding vector applied for the second layer based on the indication that the first sidelink message was not decoded successfully, where the second set of data symbols are derived from the first set of data symbols, and where the third precoding vector is derived from the second precoding vector and the fourth precoding vector is derived from the first precoding vector.

Figure 2:
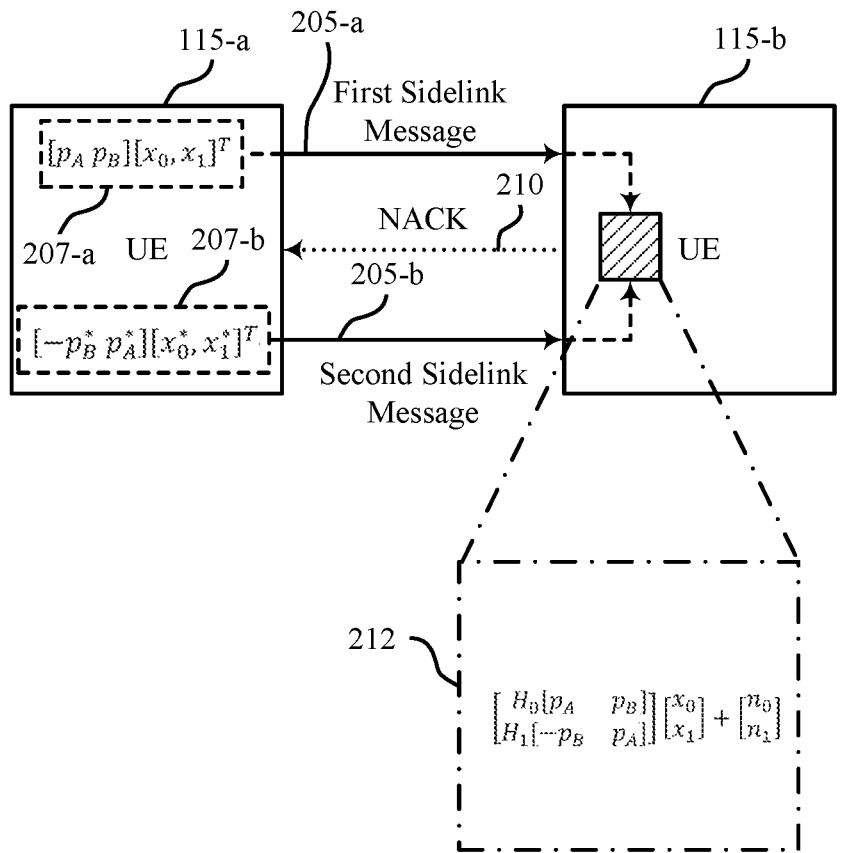
FIG. 2 illustrates an example of a wireless communications system that supports space time coding for sidelink transmissions in accordance with one or more aspects of the present disclosure.

FIG. 2 illustrates an example of a wireless communications system 200 that supports space time coding for sidelink transmissions in accordance with one or more aspects of the present disclosure. In some examples, wireless communications system 200 may implement one or more aspects of wireless communications system 100. For instance, UEs 115-a and 115-b may each be an example of a UE 115 as described with reference to FIG. 1.

Sidelink communications (e.g., CV2X) transmissions may support transmissions with a rank of 1, or, where channel conditions permit greater than 1. However, accurately predicting channel rank according to a channel state feedback process may fail more frequently as mobility increases and/or in certain communications scenarios (e.g., point to multipoint communications scenarios). Additionally, keyhole fading may occur (e.g., in dense and/or urban environments), which may result in rank deficiency. Additionally, antenna imbalance (due to antenna topology for devices that include UEs and/or antennas, such as cars). In such examples, UEs performing sidelink communications may refrain from performing MIMO (e.g., may refrain from using more than one layer for communication) due to an inability to ensure a sufficient channel rank (e.g., a channel rank above 1). Accordingly, the channel may be under-utilized (e.g., due to using a single layer) and/or may have reduced spectral efficiency. In some examples, sidelink communications (e.g., CV2X communications) may include one or more retransmission mechanisms. For instance, ACK and NACK based retransmissions (e.g., HARQ-ACK retransmissions) may occur or automatic (e.g., blind) retransmissions may occur. In some examples, a wireless device (e.g., a CV2X transmitter) may utilize a retransmission for rank 1 antenna diversity such that each retransmission is using a different transmit antenna.

The techniques described herein may use space-time coding for sidelink retransmissions suitable for two-layer (e.g., or a greater number of layers) MIMO to extend antenna diversity without explicitly predicting a rank. For instance, rank 2 transmissions may be communicated in at least some cases, whereas in other cases (e.g., in cases in which a channel is rank deficient), using a retransmission with space-time coding may enable successful decoding of 2-layer transmissions even in rank deficient (e.g., rank 1) scenarios. Accordingly, the utilization of the channel may increase.

As described herein, a first UE 115-*a* may transmit a first sidelink message 205-*a* (e.g., a physical sidelink shared channel (PSSCH) message). UE 115-*b* may receive the first sidelink message, but may fail to decode the first sidelink message 205-*a*. Accordingly, UE 115-*b* may transmit a NACK 210, which UE 115-*a* may receive. In examples in which UE 115-*a* receives the NACK 210 or in which UE 115-*a* fails to receive a response from UE 115-*b* (e.g., fails to receive an ACK), UE 115-*a* may transmit a second sidelink message 205-*b* that may include a retransmission of the first sidelink message 205-*a* with space-time coding.

For instance, the first sidelink message 205-*a* may be generated according with a form 207-*a*, which may be defined as $[p_A \ p_B][x_0 \ x_1]^T$, where $p_A$ is a first precoding vector for a first layer, $p_B$ is a second precoding vector for a second layer, $x_0$ is a first one or more data symbols of a first set of data symbols, and $x_1$ is a second one or more data symbols of a first set of data symbols. In examples in which UE 115-*b* successfully decodes first sidelink message 205-*a*, UE 115-*b* may transmit an ACK to UE 115-*a* and UE 115-*a* may refrain from transmitting second sidelink message 205-*b*. Accordingly, the next transmission from UE 115-*a* to UE 115-*b* may include new data (e.g., according to form 207-*a*) and first sidelink message 205-*a* may have effectively used the rank 2 channel to convey multiple layers concurrently. For groupcast transmissions (e.g., first sidelink message 205-*a* is transmitted to multiple UEs including UE 115-*a*), if no UE 115-*a* responds with a NACK, UE 115-*a* may refrain from transmitting second sidelink message 205-*b*. However, if a NACK 210 is received by UE 115-*a* as described herein or for a blind retransmission scheme, the second sidelink message 205-*b* may be generated with a form 207-*b*, which may be defined as $[-p_B^* \ p_A^*] [x_0^* \ x_1^*]^T$, in which the second precoding vector $p_B$ has its sign inverted, is conjugated, and is applied for the first layer; the first precoding vector $p_A$ is conjugated is applied for the second layer; and the first one or more data symbols $x_0$ and the second one or more data symbols $x_1$ are conjugated. Performing these operations for second sidelink message 205-*b* may enable second sidelink message 205-*b* to be used in an antenna diversity retransmission scheme and/or to be used as a space-time code (e.g., an Alamouti space-time code). For instance, the form 207-*b* may be a generalization of an antenna diversity retransmission scheme and/or an Alamouti space-time code. Transmitting both first sidelink message 205-*a* and second sidelink message 205-*b* may effectively reduce first sidelink message 205-*a* from a rank 2 transmission to a rank 1 transmission. Accordingly, in examples in which UE 115-*b* only supports rank 1, transmitting the first sidelink message 205-*a* and the second sidelink message 205-*b* may enable UE 115-*b* to decode the data symbols transmitted in both first sidelink message 205-*a* and second sidelink message 205-*b*.

Once UE 115-*b* receives first sidelink message 205-*a* and second sidelink message 205-*b*, UE 115-*b* may concatenate first sidelink message 205-*a* and second sidelink message 205-*b* to determine an equation 212 with the form $$\begin{bmatrix} y_0 \\ y_1^* \end{bmatrix} = \begin{bmatrix} H_0[p_A p_B] \\ H_1^*[-p_B p_A] \end{bmatrix} \begin{bmatrix} x_0 \\ x_1 \end{bmatrix} + \begin{bmatrix} n_0 \\ n_1 \end{bmatrix},$$

where $H_0$ is a first channel matrix, $H_1$ is a second channel matrix, $n_0$ is a first noise signal, $n_1$ is a second noise signal, $y_0$ is a first received signal, and $y_1$ is a second received signal (. In some examples, $y_0$ and $y_1$ may correspond to symbols received over a sub-carrier of an OFDM signal (e.g., other symbols may be received over other sub-carriers). In some examples, $H_0=H_1$ and $H_0$ and $H_1$ may be rank 1 matrices. In such examples, the concatenated matrix $$\begin{bmatrix} H_0[p_A p_B] \\ H_1^*[-p_B p_A] \end{bmatrix}$$

is rank 2. Additionally, in examples in which $H_0 \ [p_A \ p_B]$ is rank deficient (e.g., has a rank of 1), the eigenvalues of $$\begin{bmatrix} H_0[p_A p_B] \\ H_1^*[-p_B p_A] \end{bmatrix}$$

may be the same as the eigenvalue (e.g., the single eigenvalue) of $H_0 \ [p_A \ p_B]$ but with a multiplicity of two. In some such examples, an optimal rate may be achieved.

In examples in which decoding failure occurs for the first sidelink message 205-*a*, one or both layer may not be decoded correctly. However, by transmitting second sidelink message 205-*b* with space-time coding, recovery may occur such that both layers may be correctly decoded. In such cases, since the channel may have a rank 1, transmitting two layers may be the maximum that may be achieved after the second sidelink message 205-*b* is transmitted (e.g., with optimal rate). Additionally, performing space-time coding on the second sidelink message 205-*b* may compensate for signal to noise ratio (SNR) below a threshold amount. Accordingly, the first sidelink message 205-*a* and the second sidelink message 205-*b* may use a higher MCS as compared to communication schemes in which second sidelink message 205-*b* is not transmitted with space-time coding (e.g., due to the increased diversity associated with performing the space-time coding on second sidelink message 205-*b*). In some such cases, a more spectrally efficient usage of a rank 2 channel may result. Performing the space-time coding may enable implicit match of the SNR and/or MCS to without an explicit CSI-RS process (e.g., communicating CSI-RSs between UE 115-*a* and UE 115-*b*).

In some examples, performing the space-time coding may involve agreement between UE 115-*a* and 115-*b* such that UE 115-*b* may implement a space-time decoder, which may enable UE 115-*b* to take advantage of the code. In some examples, UE 115-*b* may communicate with UE 115-*a* a capability to perform space-time decoding (e.g., an explicit indication, an indication of whether or not UE 115-*a* or UE 115-*b* may perform MIMO). Additionally or alternatively, UE 115-*a* may communicate with UE 115-*b*, a capability to perform space-time encoding (e.g., an explicit indication, an indication of whether or not UE 115-*a* or UE 115-*b* may perform MIMO). In some examples, certain types of UEs (e.g., UEs that support MIMO) may be configured to support space-time decoding and/or space-time encoding, whereas other types of UEs (e.g., UEs that do not support MIMO) may not be configured to support space-time decoding and/or space-time encoding.

In some examples, space-time coding may be used with HARQ incremental redundancy (IR). For instance, first sidelink message 205-*a* and second sidelink message 205-*b* may use space-time coding with a first IR version. However, if third and fourth sidelink messages are transmitted (e.g., a second and third retransmission, respectively, due to UE 115-b failing to decode second sidelink message 205-b), the third and fourth sidelink messages may use the same code construction (e.g., space-time coding for the fourth transmission) with a second IR version such that multiple groups of transmissions are used together to decode the space-time code and the result may be used for a demodulation attempt and/or stored in a HARQ buffer (e.g., if decoding fails). Accordingly, implicit matching of rank and/or matching of coding rate may be achieved without an explicit feedback process (e.g., an explicit CSI-RS process).

In some examples, the space-time code utilized may be used for greater than two layers. For instance, a space-time code for three layers may have the form $$\begin{bmatrix} p_A & p_B & p_C \\ -p_B & p_A & -p_D \\ -p_C & p_D & p_A \\ -p_D & -p_C & p_B \\ p_A^* & p_B^* & p_C^* \\ -p_B^* & p_A^* & -p_D^* \\ -p_C^* & p_D^* & p_A^* \\ -p_D^* & -p_C^* & p_B^* \end{bmatrix},$$

where $p_A$ is a first precoding vector, $p_B$ is a second precoding vector, $p_C$ is a third precoding vector, and $p_D$ is a fourth precoding vector. In some such examples, first sidelink message 205-a may generate a message with the form $[p_A\ p_B\ p_C]\ [x_0\ x_1\ x_2]^T$, where $x_0$ may be a first one or more data symbols of a set of data symbols, $x_1$ may be a second one or more data symbols of a set of data symbols, and $x_2$ may be a third one or more data symbols of a set of data symbols. Additionally, in some such examples, second sidelink message 205-b may be transmitted using $[-p_B\ p_A\ -p_D]$. If second sidelink message 205-b is not decoded, UE 115-a may generate additional sidelink messages using additional rows of the space-time code. In examples in which UE 115-b only supports rank 1, transmitting three sidelink messages according to the techniques described herein may enable UE 115-b to decode the data symbols transmitted in the three sidelink messages (e.g., the rank of each of the three sidelink messages may be effectively reduced to 1). Similarly, if UE 115-b supports rank 2 but not rank 3, multiple sidelink messages (e.g., 2 sidelink messages) may be transmitted according to the techniques described herein to enable UE 115-b to decode the data symbols transmitted in the multiple sidelink messages.

Figure 3:
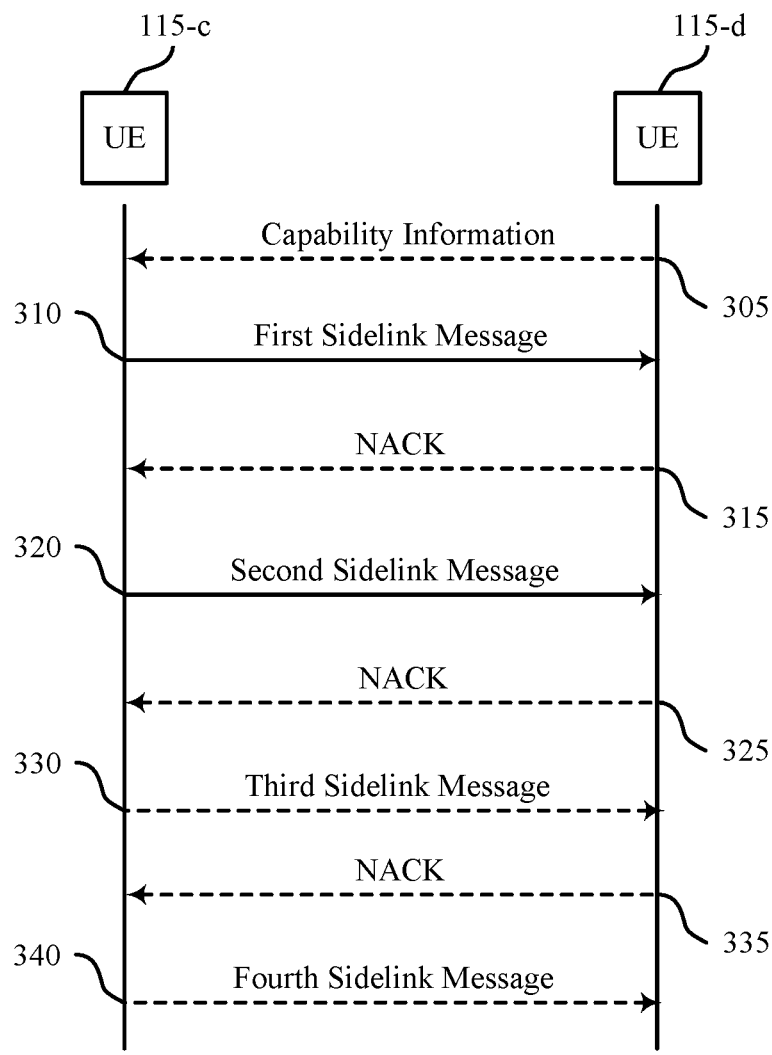
FIG. 3 illustrates an example of a process flow that supports space time coding for sidelink transmissions in accordance with one or more aspects of the present disclosure.

FIG. 3 illustrates an example of a process flow 300 that supports space time coding for sidelink transmissions in accordance with one or more aspects of the present disclosure. In some examples, process flow 300 may implement one or more aspects of wireless communications systems 100 and/or 200. For instance, UE 115-c may be an example of UE 115-a as described with reference to FIG. 2 and/or a UE 115 as described with reference to FIG. 1. Additionally or alternatively, UE 115-d may be an example of UE 115-b as described with reference to FIG. 2 and/or a UE 115 as described with reference to FIG. 1.

At 305, UE 115-d may transmit capability information to UE 115-c. In some examples, the capability information may include an indication of whether UE 115-d supports MIMO.

At 310, UE 115-c may transmit a first sidelink message to UE 115-d. The first sidelink message may include a first set of data symbols using a first precoding vector applied for a first layer and a second precoding vector applied for a second layer. In some examples, UE 115-d may monitor for the first sidelink message.

At 315, UE 115-d may transmit a NACK to UE 115-c. In some examples, the NACK may indicate or may include an indication that the first sidelink message was not decoded successfully (e.g., by UE 115-d).

At 320, UE 115-c may transmit a second sidelink message to UE 115-d. The second sidelink message may include a second set of data symbols using a third precoding vector applied for the first layer and a fourth precoding vector applied for the second layer based on receiving the NACK. In some examples, the second set of data symbols may be derived from the first set of data symbols and the third precoding vector may be derived from the second precoding vector. Additionally or alternatively, the fourth precoding vector may be derived from the first precoding vector. In some examples, the third precoding vector and the fourth precoding vector may be based on the capability information. In some examples, using the third precoding vector and the fourth precoding vector for the second sidelink message may be based on whether UE 115-d supports MIMO. In some examples, the third precoding vector may be derived based on inverting a sign of the second precoding vector and conjugating the second precoding vector with the inverted sign. Additionally or alternatively, the fourth precoding vector may be derived based on conjugating the first precoding vector. In some examples, the second set of data symbols are obtained by conjugating the first set of data symbols. In some examples, the first sidelink message and the second sidelink message are associated with (e.g., are examples of) CV2X communications. In some examples, UE 115-d may decode the second sidelink message, where the decoding includes applying a channel matrix to the first sidelink message that reduces a rank of the first sidelink message to a rank of 1.

At 325, UE 115-d may transmit a NACK to UE 115-c. In some examples, the NACK may indicate or may include an indication that the second sidelink message was not decoded successfully (e.g., by UE 115-d).

At 330, UE 115-c may transmit a third sidelink message to UE 115-d. In some examples, the third sidelink message may include the first set of data symbols using a fifth precoding vector applied for the first layer and a sixth precoding vector applied for the second layer.

At 335, UE 115-d may transmit a NACK to UE 115-c. In some examples, the NACK may indicate or may include an indication that the third sidelink message was not decoded successfully (e.g., by UE 115-d).

At 340, UE 115-c may transmit a fourth sidelink message to UE 115-d. In some examples, the fourth message may include the second set of data symbols using a seventh precoding vector applied for the first layer and an eight precoding vector applied for the second layer, where the seventh precoding vector is derived from the sixth precoding vector and the eighth precoding vector is derived from the fifth precoding vector. In some examples, the first sidelink message and the second sidelink message may be associated with a first IR version and the third sidelink message and the fourth sidelink message are associated with a second IR version.

Figure 4:
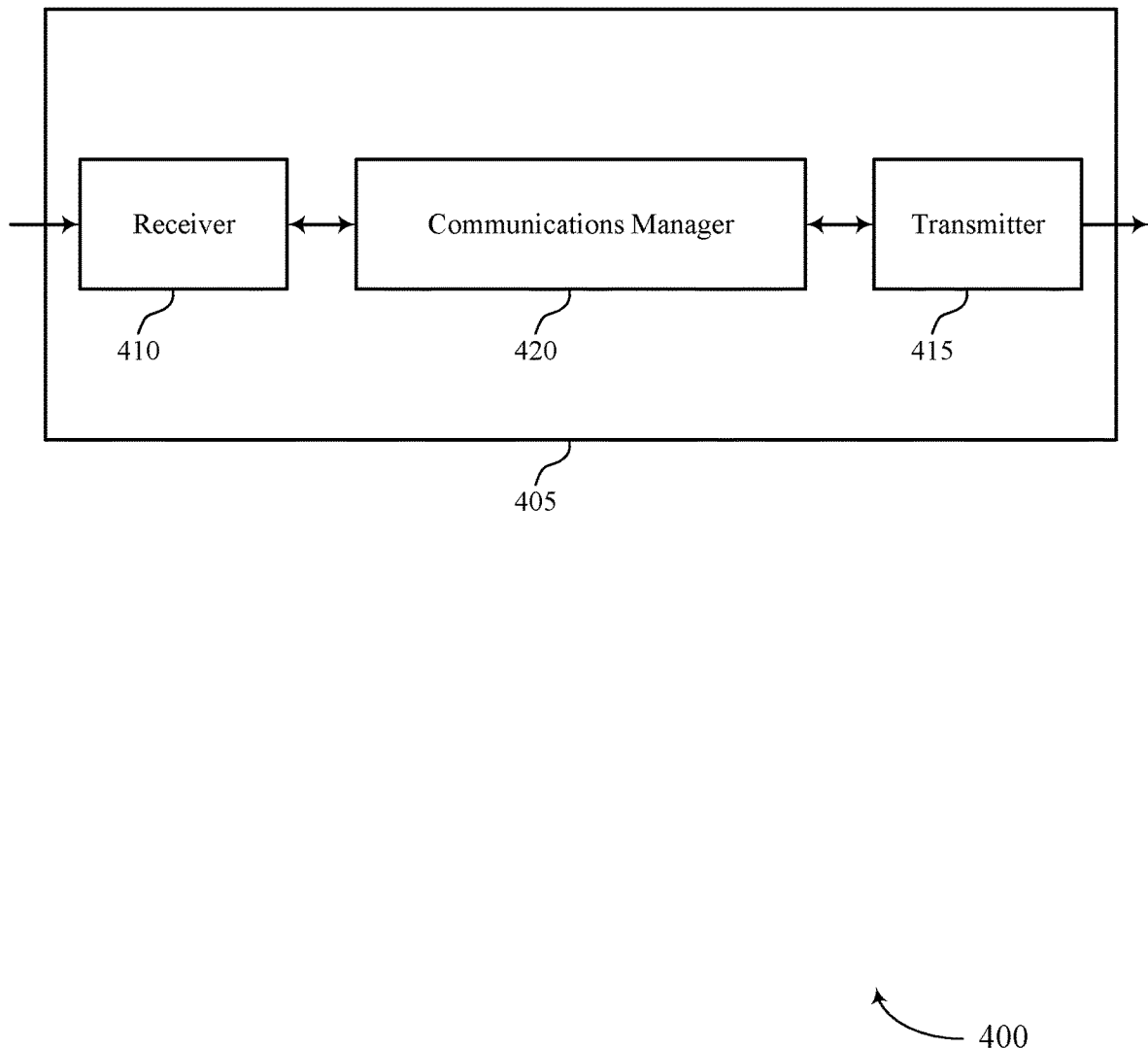
FIGS. 4 and 5 illustrate block diagrams of devices that support space time coding for sidelink transmissions in accordance with one or more aspects of the present disclosure.

FIG. 4 illustrates a block diagram 400 of a device 405 that supports space time coding for sidelink transmissions in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to space time coding for sidelink transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to space time coding for sidelink transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of space time coding for sidelink transmissions as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

Additionally, or alternatively, the communications manager 420 may support wireless communication in accordance with examples as disclosed herein. For example, the communications manager 420 may be configured as or otherwise support a means for transmitting a first sidelink message including a first set of data symbols using a first precoding vector applied for a first layer and a second precoding vector applied for a second layer. The communications manager 420 may be configured as or otherwise support a means for receiving an indication that the first sidelink message was not decoded successfully. The communications manager 420 may be configured as or otherwise support a means for transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

Additionally, or alternatively, the communications manager 420 may support wireless communication in accordance with examples as disclosed herein. For example, the communications manager 420 may be configured as or otherwise support a means for monitoring for a first sidelink message including a first set of data symbols using a first precoding vector applied for a first layer and a second precoding vector applied for a second layer. The communications manager 420 may be configured as or otherwise support a means for transmitting an indication that the first sidelink message was not decoded successfully. The communications manager 420 may be configured as or otherwise support a means for receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for multi-rank sidelink communications to be reduced to single rank communications if failure to decode the multi-rank sidelink communications occurs.

Figure 5:
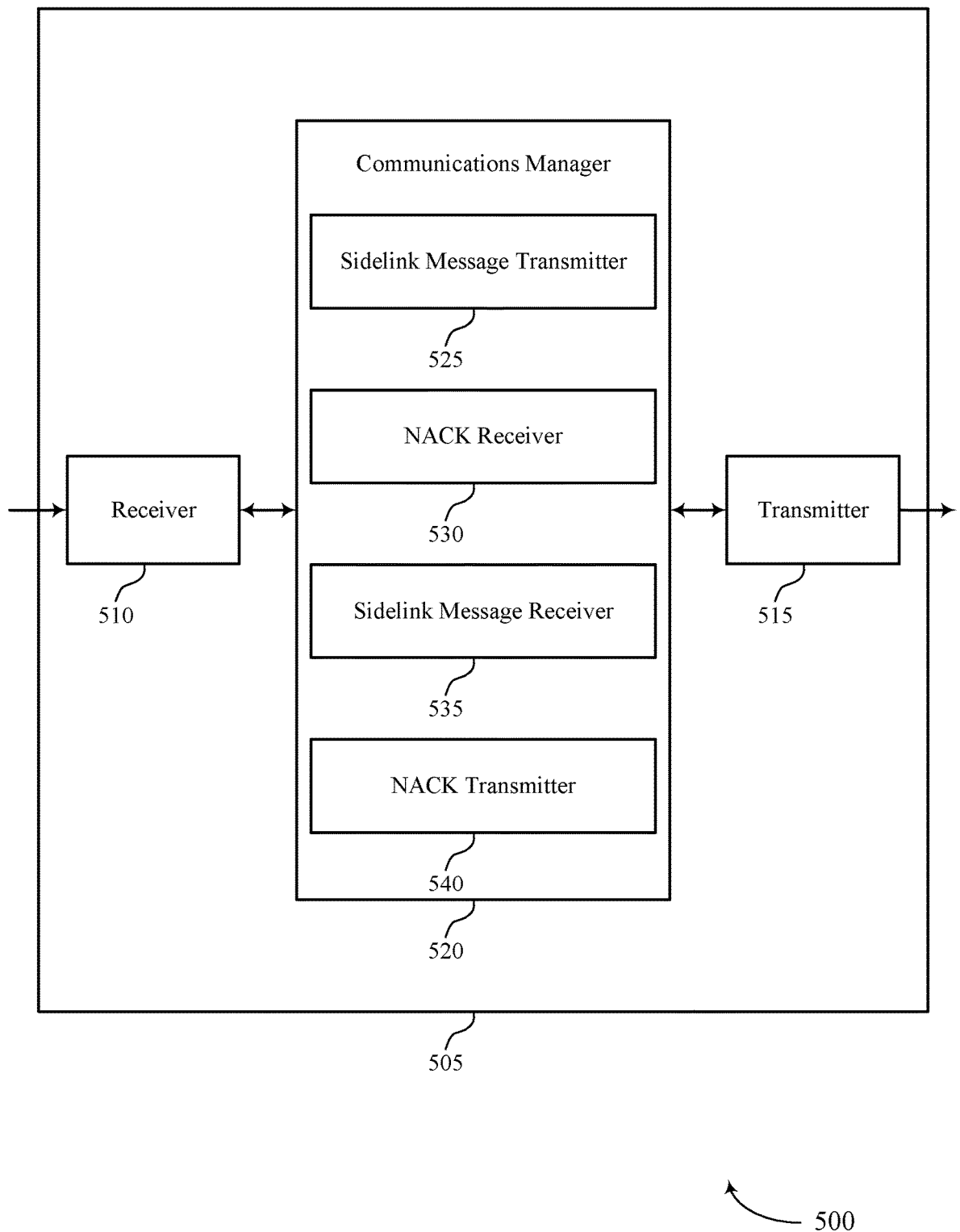

FIG. 5 illustrates a block diagram 500 of a device 505 that supports space time coding for sidelink transmissions in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to space time coding for sidelink transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to space time coding for sidelink transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of space time coding for sidelink transmissions as described herein. For example, the communications manager 520 may include a sidelink message transmitter 525, a NACK receiver 530, a sidelink message receiver 535, a NACK transmitter 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The sidelink message transmitter 525 may be configured as or otherwise support a means for transmitting a first sidelink message including a first set of data symbols using a first precoding vector applied for a first layer and a second precoding vector applied for a second layer. The NACK receiver 530 may be configured as or otherwise support a means for receiving an indication that the first sidelink message was not decoded successfully. The sidelink message transmitter 525 may be configured as or otherwise support a means for transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

Additionally, or alternatively, the communications manager 520 may support wireless communication in accordance with examples as disclosed herein. The sidelink message receiver 535 may be configured as or otherwise support a means for monitoring for a first sidelink message including a first set of data symbols using a first precoding vector applied for a first layer and a second precoding vector applied for a second layer. The NACK transmitter 540 may be configured as or otherwise support a means for transmitting an indication that the first sidelink message was not decoded successfully. The sidelink message receiver 535 may be configured as or otherwise support a means for receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

Figure 6:
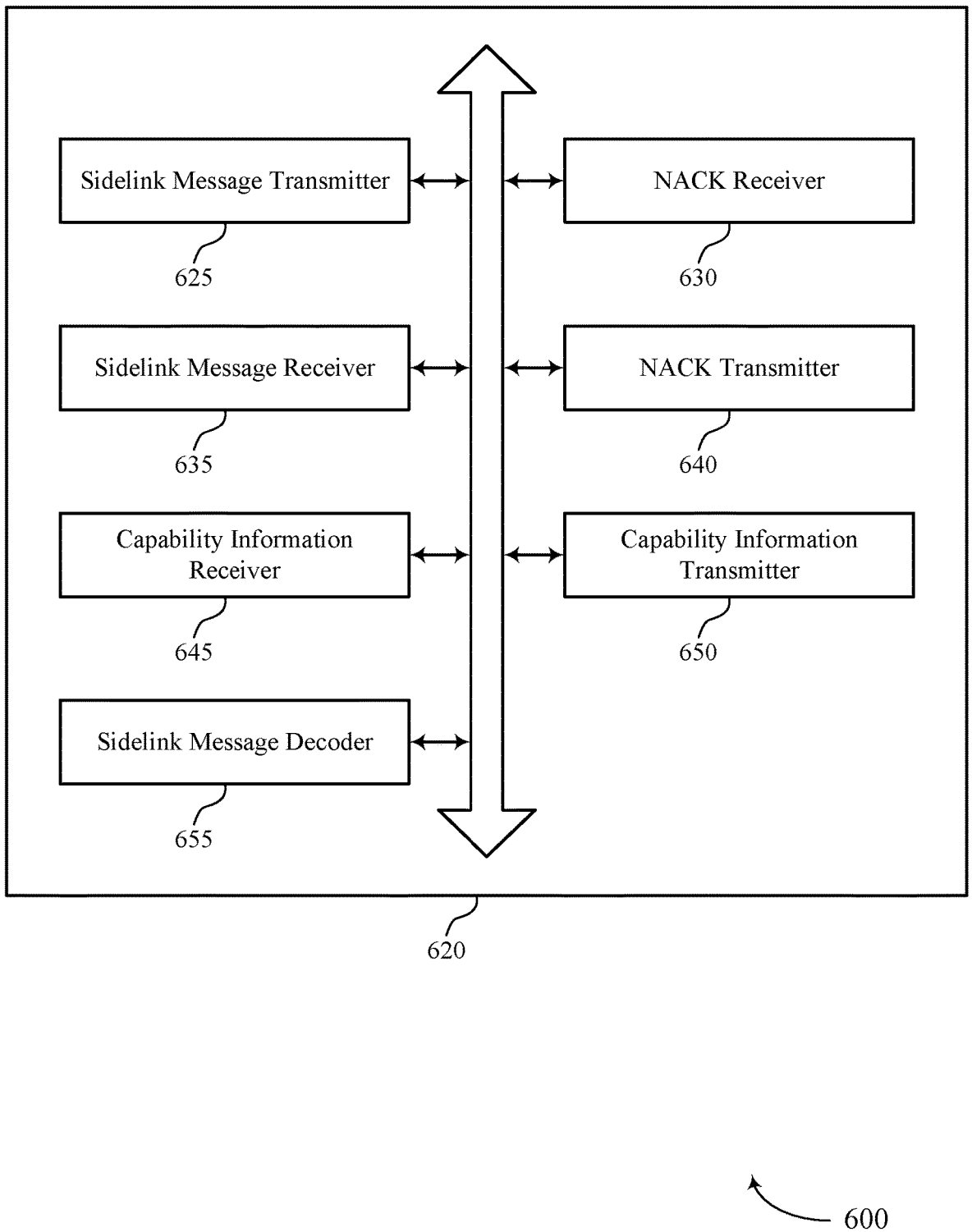
FIG. 6 illustrates a block diagram of a communications manager that supports space time coding for sidelink transmissions in accordance with one or more aspects of the present disclosure.

FIG. 6 illustrates a block diagram 600 of a communications manager 620 that supports space time coding for sidelink transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of space time coding for sidelink transmissions as described herein. For example, the communications manager 620 may include a sidelink message transmitter 625, a NACK receiver 630, a sidelink message receiver 635, a NACK transmitter 640, a capability information receiver 645, a capability information transmitter 650, a sidelink message decoder 655, or any combination thereof. Each of these components may communicate, directly or indirectly, with one another (e.g., via one or more buses).

Additionally, or alternatively, the communications manager 620 may support wireless communication in accordance with examples as disclosed herein. The sidelink message transmitter 625 may be configured as or otherwise support a means for transmitting a first sidelink message including a first set of data symbols using a first precoding vector applied for a first layer and a second precoding vector applied for a second layer. The NACK receiver 630 may be configured as or otherwise support a means for receiving an indication that the first sidelink message was not decoded successfully. In some examples, the sidelink message transmitter 625 may be configured as or otherwise support a means for transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

In some examples, the capability information receiver 645 may be configured as or otherwise support a means for receiving capability information from a wireless device, where using the third precoding vector and the fourth precoding vector for the second sidelink message is based on receiving the capability information.

In some examples, the capability information includes an indication of whether the wireless device supports multiple input multiple output (MIMO). In some examples, using the third precoding vector and the fourth precoding vector for the second sidelink message is based on whether the device supports MIMO.

In some examples, the sidelink message transmitter 625 may be configured as or otherwise support a means for transmitting a third sidelink message including the first set of data symbols using a fifth precoding vector applied for the first layer and a sixth precoding vector applied for the second layer. In some examples, the sidelink message transmitter 625 may be configured as or otherwise support a means for transmitting a fourth sidelink message including the second set of data symbols using a seventh precoding vector applied for the first layer and an eighth precoding vector applied for the second layer, where the seventh precoding vector is derived from the sixth precoding vector and the eighth precoding vector is derived from the fifth precoding vector, and where the first sidelink message and the second sidelink message are associated with a first incremental redundancy version and the third sidelink message and the fourth sidelink message are associated with a second incremental redundancy version.

In some examples, the third precoding vector is derived based on inverting a sign of the second precoding vector and conjugating the second precoding vector with the inverted sign. In some examples, the fourth precoding vector is derived based on conjugating the first precoding vector.

In some examples, the second set of data symbols are obtained by conjugating the first set of data symbols.

In some examples, the first sidelink message and the second sidelink message are associated with cellular vehicle to everything (CV2X) communications.

Additionally, or alternatively, the communications manager 620 may support wireless communication in accordance with examples as disclosed herein. The sidelink message receiver 635 may be configured as or otherwise support a means for monitoring for a first sidelink message including a first set of data symbols using a first precoding vector applied for a first layer and a second precoding vector applied for a second layer. The NACK transmitter 640 may be configured as or otherwise support a means for transmitting an indication that the first sidelink message was not decoded successfully. In some examples, the sidelink message receiver 635 may be configured as or otherwise support a means for receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

In some examples, the capability information transmitter 650 may be configured as or otherwise support a means for transmitting capability information to a wireless device, where receiving the second sidelink message including the second set of data symbols using a third precoding vector applied for the first layer and a fourth precoding vector applied for the second layer is based on transmitting the capability information.

In some examples, the capability information includes an indication of whether the wireless device supports multiple input multiple output (MIMO). In some examples, receiving the second sidelink message including the second set of data symbols using a third precoding vector applied for the first layer and a fourth precoding vector applied for the second layer is based on whether the device supports MIMO.

In some examples, the first sidelink message has a rank of 2, and the sidelink message decoder 655 may be configured as or otherwise support a means for decoding the second sidelink message, where the decoding includes applying a channel matrix to the first sidelink message that reduces a rank of the first sidelink message to a rank of 1.

In some examples, the third precoding vector is derived based on inverting a sign of the second precoding vector and conjugating the second precoding vector with the inverted sign. In some examples, the fourth precoding vector is derived based on conjugating the first precoding vector.

In some examples, the second set of data symbols are obtained by conjugating the first set of data symbols.

In some examples, the first sidelink message and the second sidelink message are associated with cellular vehicle to everything (CV2X) communications.

Figure 7:
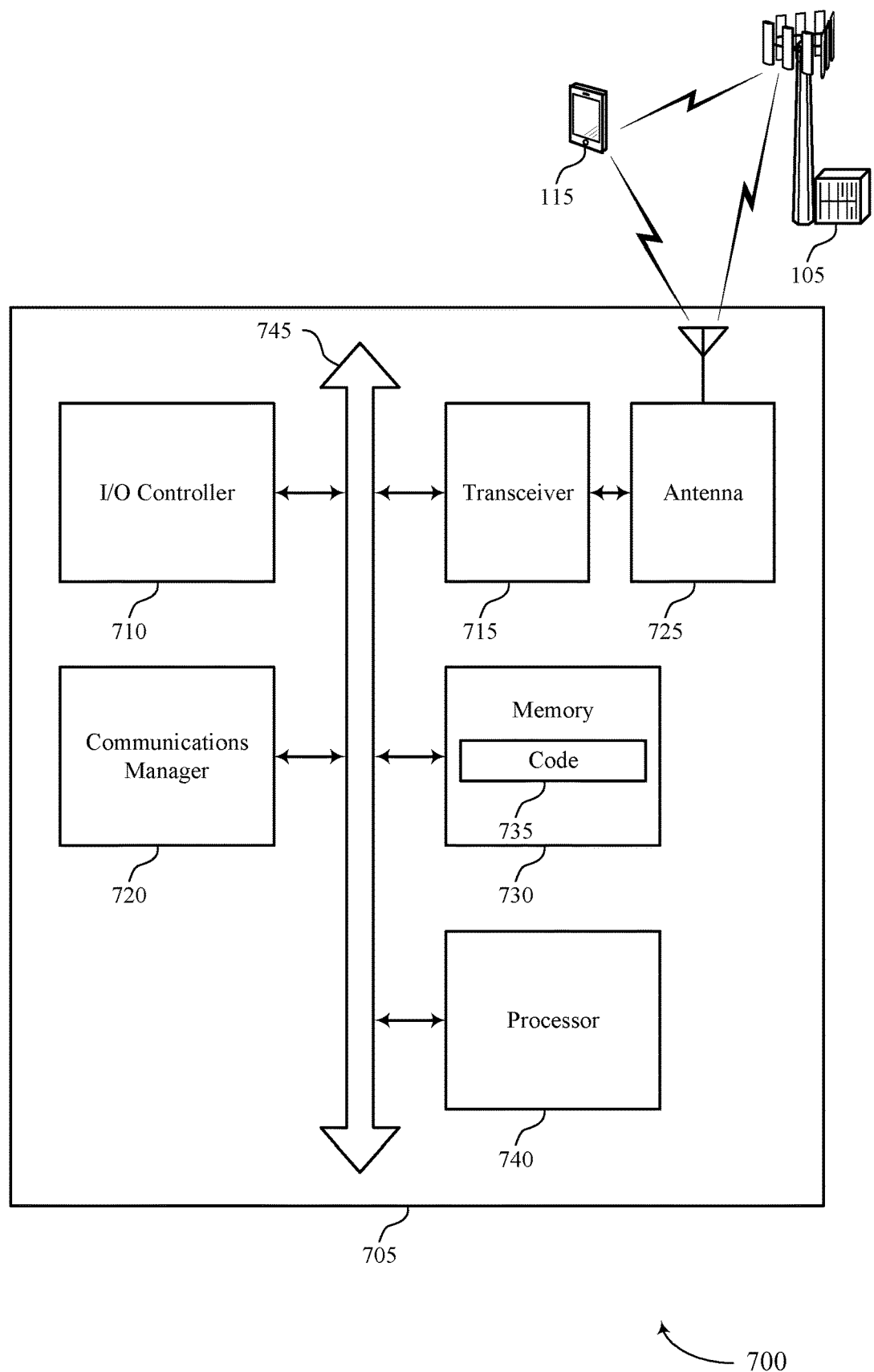
FIG. 7 illustrates a diagram of a system including a device that supports space time coding for sidelink transmissions in accordance with one or more aspects of the present disclosure.

FIG. 7 illustrates a diagram of a system 700 including a device 705 that supports space time coding for sidelink transmissions in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting space time coding for sidelink transmissions). For example, the device 705 or a component of the device 705 may include a processor 740 and memory 730 coupled with or to the processor 740, the processor 740 and memory 730 configured to perform various functions described herein.

Additionally, or alternatively, the communications manager 720 may support wireless communication in accordance with examples as disclosed herein. For example, the communications manager 720 may be configured as or otherwise support a means for transmitting a first sidelink message including a first set of data symbols using a first precoding vector applied for a first layer and a second precoding vector applied for a second layer. The communications manager 720 may be configured as or otherwise support a means for receiving an indication that the first sidelink message was not decoded successfully. The communications manager 720 may be configured as or otherwise support a means for transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector.

Additionally, or alternatively, the communications manager 720 may support wireless communication in accordance with examples as disclosed herein. For example, the communications manager 720 may be configured as or otherwise support a means for monitoring for a first sidelink message including a first set of data symbols using a first precoding vector applied for a first layer and a second precoding vector applied for a second layer. The communications manager 720 may be configured as or otherwise support a means for transmitting an indication that the first sidelink message was not decoded successfully. The communications manager 720 may be configured as or otherwise support a means for receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector.

By including or configuring the communications manager 720 in accordance with examples as described herein, the device 705 may support techniques for multi-rank sidelink communications to be reduced to single rank communications if failure to decode the multi-rank sidelink communications occurs.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of space time coding for sidelink transmissions as described herein, or the processor 740 and the memory 730 may be otherwise configured to perform or support such operations.

Figure 8:
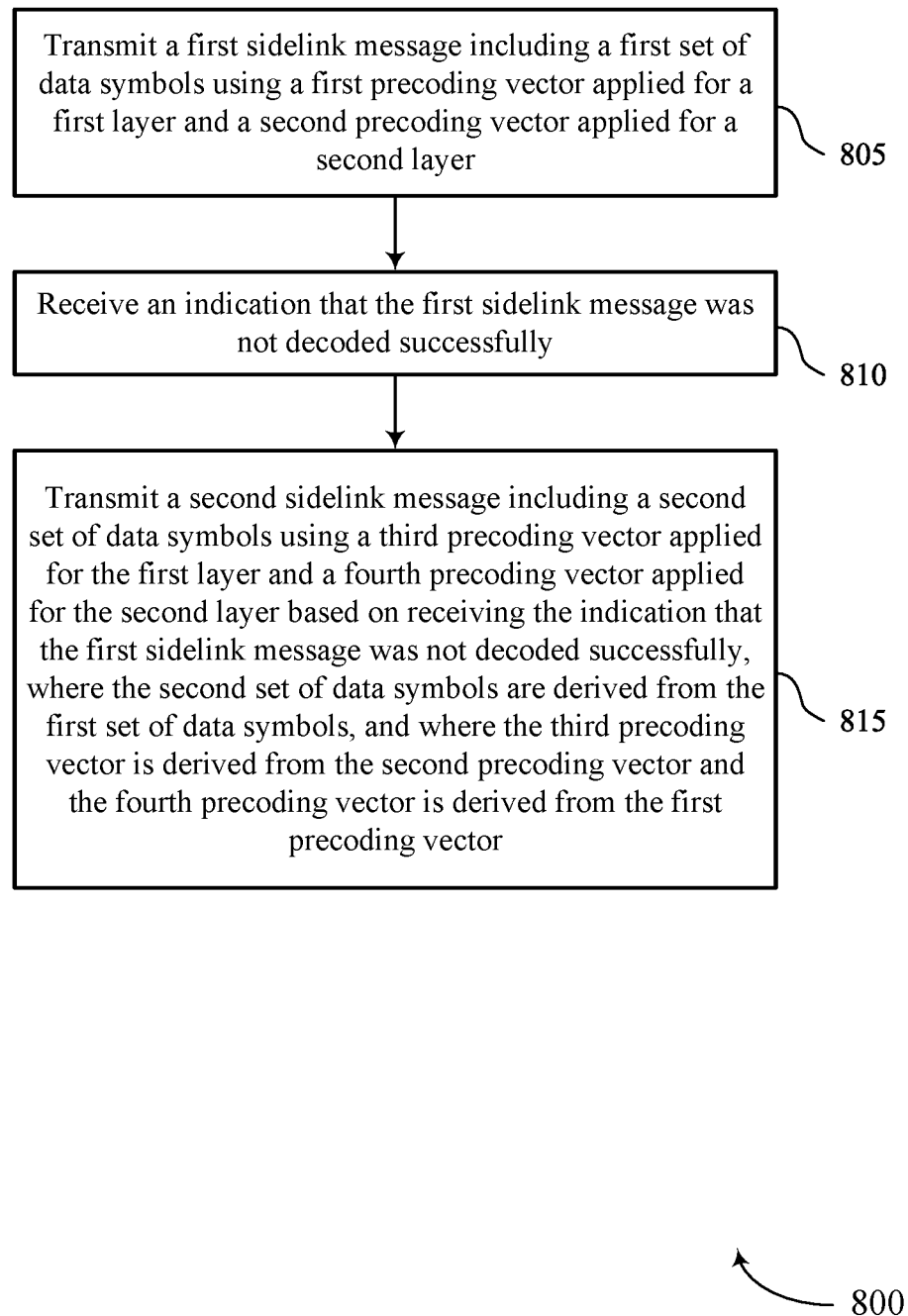
FIGS. 8 through 11 illustrate flowcharts showing methods that support space time coding for sidelink transmissions in accordance with one or more aspects of the present disclosure.

FIG. 8 illustrates a flowchart showing a method 800 that supports space time coding for sidelink transmissions in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include transmitting a first sidelink message including a first set of data symbols using a first precoding vector applied for a first layer and a second precoding vector applied for a second layer. The operations of 805 may be performed in accordance with examples as disclosed herein. In some examples, aspects of the operations of 805 may be performed by a sidelink message transmitter 625 as described with reference to FIG. 6.

At 810, the method may include receiving an indication that the first sidelink message was not decoded successfully. The operations of 810 may be performed in accordance with examples as disclosed herein. In some examples, aspects of the operations of 810 may be performed by a NACK receiver 630 as described with reference to FIG. 6.

At 815, the method may include transmitting a second sidelink message including a second set of data symbols using a third precoding vector applied for the first layer and a fourth precoding vector applied for the second layer based on receiving the indication that the first sidelink message was not decoded successfully, where the second set of data symbols are derived from the first set of data symbols, and where the third precoding vector is derived from the second precoding vector and the fourth precoding vector is derived from the first precoding vector. The operations of 815 may be performed in accordance with examples as disclosed herein. In some examples, aspects of the operations of 815 may be performed by a sidelink message transmitter 625 as described with reference to FIG. 6.

Figure 9:
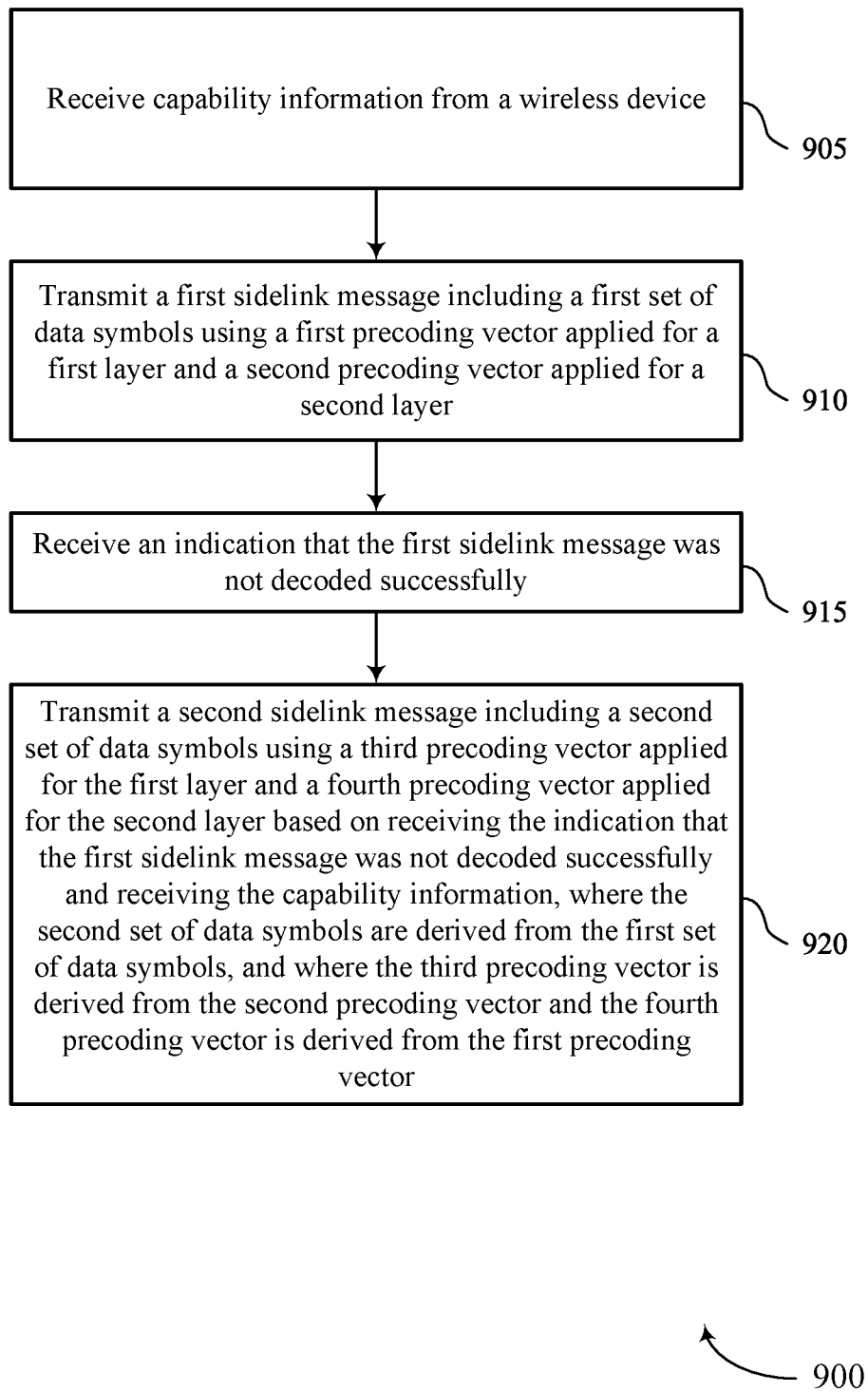

FIG. 9 illustrates a flowchart showing a method 900 that supports space time coding for sidelink transmissions in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving capability information from a wireless device. The operations of 905 may be performed in accordance with examples as disclosed herein. In some examples, aspects of the operations of 905 may be performed by a capability information receiver 645 as described with reference to FIG. 6.

At 910, the method may include transmitting a first sidelink message including a first set of data symbols using a first precoding vector applied for a first layer and a second precoding vector applied for a second layer. The operations of 910 may be performed in accordance with examples as disclosed herein. In some examples, aspects of the operations of 910 may be performed by a sidelink message transmitter 625 as described with reference to FIG. 6.

At 915, the method may include receiving an indication that the first sidelink message was not decoded successfully. The operations of 915 may be performed in accordance with examples as disclosed herein. In some examples, aspects of the operations of 915 may be performed by a NACK receiver 630 as described with reference to FIG. 6.

At 920, the method may include transmitting a second sidelink message including a second set of data symbols using a third precoding vector applied for the first layer and a fourth precoding vector applied for the second layer based on receiving the indication that the first sidelink message was not decoded successfully and receiving the capability information, where the second set of data symbols are derived from the first set of data symbols, and where the third precoding vector is derived from the second precoding vector and the fourth precoding vector is derived from the first precoding vector. The operations of 920 may be performed in accordance with examples as disclosed herein. In some examples, aspects of the operations of 920 may be performed by a sidelink message transmitter 625 as described with reference to FIG. 6.

Figure 10:
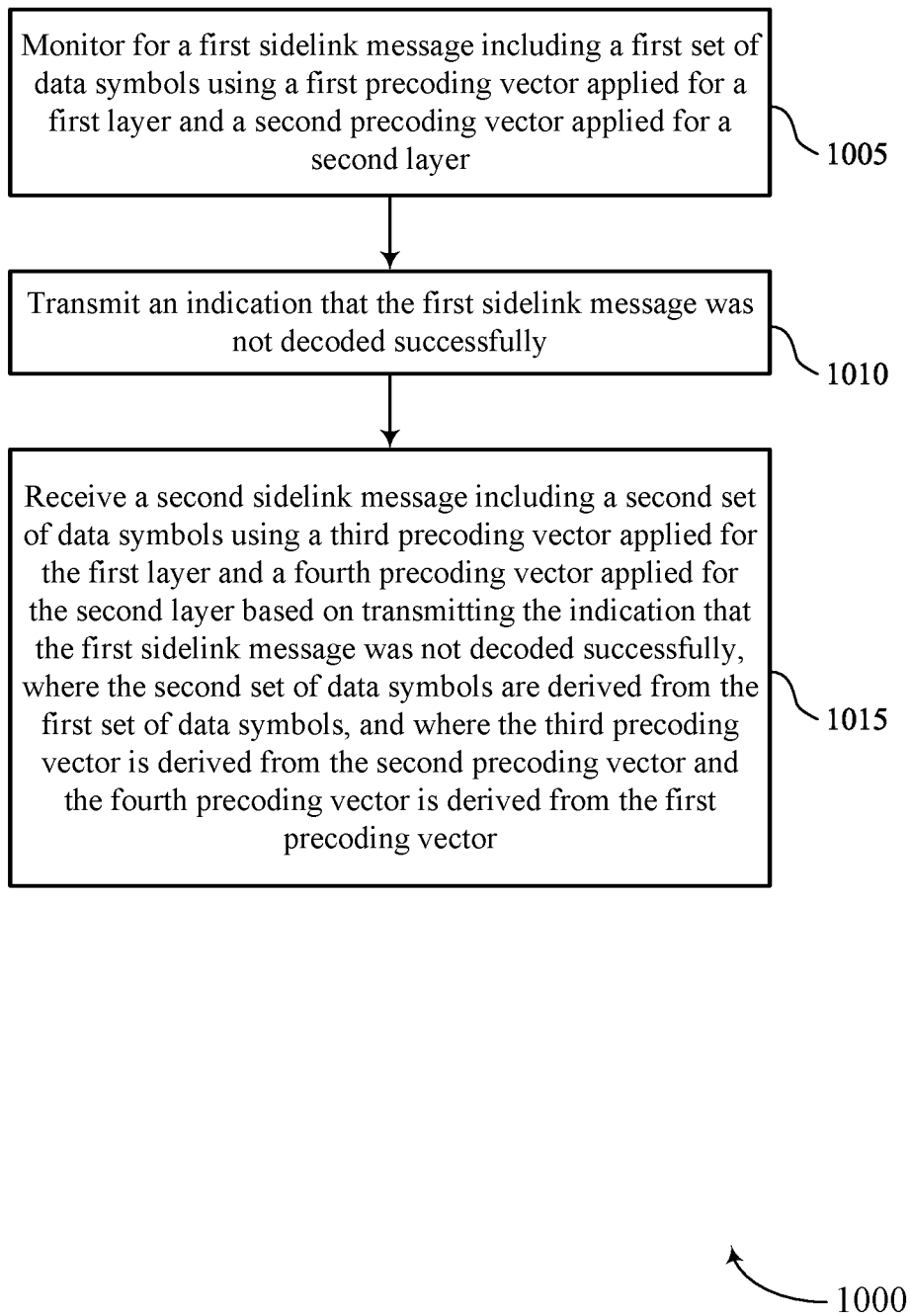

FIG. 10 illustrates a flowchart showing a method 1000 that supports space time coding for sidelink transmissions in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include monitoring for a first sidelink message including a first set of data symbols using a first precoding vector applied for a first layer and a second precoding vector applied for a second layer. The operations of 1005 may be performed in accordance with examples as disclosed herein. In some examples, aspects of the operations of 1005 may be performed by a sidelink message receiver 635 as described with reference to FIG. 6.

At 1010, the method may include transmitting an indication that the first sidelink message was not decoded successfully. The operations of 1010 may be performed in accordance with examples as disclosed herein. In some examples, aspects of the operations of 1010 may be performed by a NACK transmitter 640 as described with reference to FIG. 6.

At 1015, the method may include receiving a second sidelink message including a second set of data symbols using a third precoding vector applied for the first layer and a fourth precoding vector applied for the second layer based on transmitting the indication that the first sidelink message was not decoded successfully, where the second set of data symbols are derived from the first set of data symbols, and where the third precoding vector is derived from the second precoding vector and the fourth precoding vector is derived from the first precoding vector. The operations of 1015 may be performed in accordance with examples as disclosed herein. In some examples, aspects of the operations of 1015 may be performed by a sidelink message receiver 635 as described with reference to FIG. 6.

Figure 11:
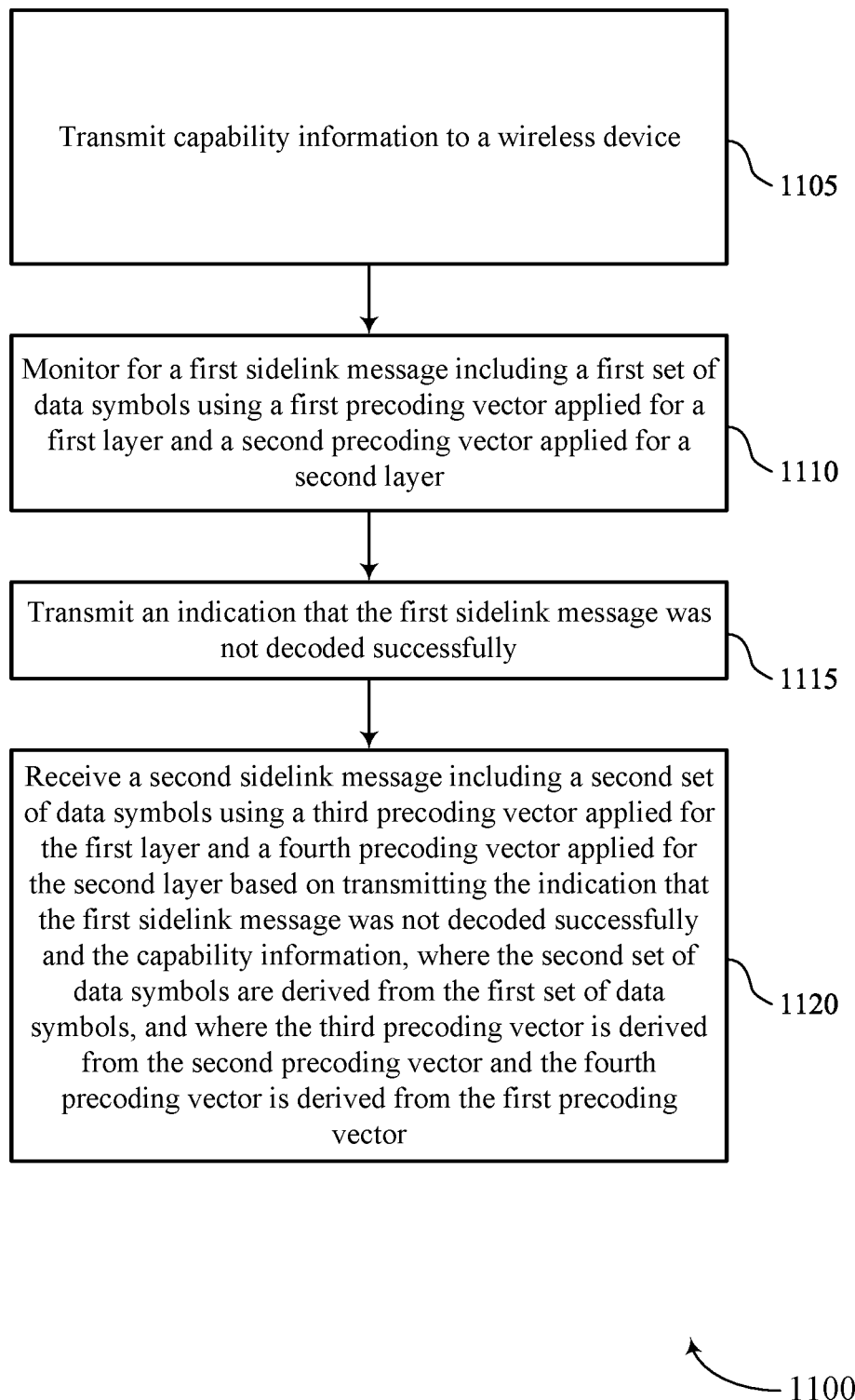

FIG. 11 illustrates a flowchart showing a method 1100 that supports space time coding for sidelink transmissions in accordance with one or more aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include transmitting capability information to a wireless device. The operations of 1105 may be performed in accordance with examples as disclosed herein. In some examples, aspects of the operations of 1105 may be performed by a capability information transmitter 650 as described with reference to FIG. 6.

At 1110, the method may include monitoring for a first sidelink message including a first set of data symbols using a first precoding vector applied for a first layer and a second precoding vector applied for a second layer. The operations of 1110 may be performed in accordance with examples as disclosed herein. In some examples, aspects of the operations of 1110 may be performed by a sidelink message receiver 635 as described with reference to FIG. 6.

At 1115, the method may include transmitting an indication that the first sidelink message was not decoded successfully. The operations of 1115 may be performed in accordance with examples as disclosed herein. In some examples, aspects of the operations of 1115 may be performed by a NACK transmitter 640 as described with reference to FIG. 6.

At 1120, the method may include receiving a second sidelink message including a second set of data symbols using a third precoding vector applied for the first layer and a fourth precoding vector applied for the second layer based on transmitting the indication that the first sidelink message was not decoded successfully and the capability information, where the second set of data symbols are derived from the first set of data symbols, and where the third precoding vector is derived from the second precoding vector and the fourth precoding vector is derived from the first precoding vector. The operations of 1120 may be performed in accordance with examples as disclosed herein. In some examples, aspects of the operations of 1120 may be performed by a sidelink message receiver 635 as described with reference to FIG. 6.

The following provides an overview of aspects of the present disclosure:

Aspect 1: A method for wireless communication, comprising: transmitting a first sidelink message comprising a first set of data symbols using a first precoding vector applied for a first layer and a second precoding vector applied for a second layer; receiving an indication that the first sidelink message was not decoded successfully; and transmitting a second sidelink message comprising a second set of data symbols using a third precoding vector applied for the first layer and a fourth precoding vector applied for the second layer based at least in part on receiving the indication that the first sidelink message was not decoded successfully, wherein the second set of data symbols are derived from the first set of data symbols, and wherein the third precoding vector is derived from the second precoding vector and the fourth precoding vector is derived from the first precoding vector.

Aspect 2: The method of aspect 1, further comprising: receiving capability information from a wireless device, wherein using the third precoding vector and the fourth precoding vector for the second sidelink message is based at least in part on receiving the capability information.

Aspect 3: The method of aspect 2, wherein the capability information comprises an indication of whether the wireless device supports multiple input multiple output (MIMO), and using the third precoding vector and the fourth precoding vector for the second sidelink message is based at least in part on whether the device supports MIMO.

Aspect 4: The method of any of aspects 1 through 3, further comprising: transmitting a third sidelink message comprising the first set of data symbols using a fifth precoding vector applied for the first layer and a sixth precoding vector applied for the second layer; and transmitting a fourth sidelink message comprising the second set of data symbols using a seventh precoding vector applied for the first layer and an eighth precoding vector applied for the second layer, wherein the seventh precoding vector is derived from the sixth precoding vector and the eighth precoding vector is derived from the fifth precoding vector, and wherein the first sidelink message and the second sidelink message are associated with a first incremental redundancy version and the third sidelink message and the fourth sidelink message are associated with a second incremental redundancy version.

Aspect 5: The method of any of aspects 1 through 4, wherein the third precoding vector is derived based at least in part on inverting a sign of the second precoding vector and conjugating the second precoding vector with the inverted sign, and the fourth precoding vector is derived based at least in part on conjugating the first precoding vector.

Aspect 6: The method of aspect 5, wherein the second set of data symbols are obtained by conjugating the first set of data symbols.

Aspect 7: The method of any of aspects 1 through 6, wherein the first sidelink message and the second sidelink message are associated with cellular vehicle to everything (CV2X) communications.

Aspect 8: A method for wireless communication, comprising: monitoring for a first sidelink message comprising a first set of data symbols using a first precoding vector applied for a first layer and a second precoding vector applied for a second layer; transmitting an indication that the first sidelink message was not decoded successfully; and receiving a second sidelink message comprising a second set of data symbols using a third precoding vector applied for the first layer and a fourth precoding vector applied for the second layer based at least in part on transmitting the indication that the first sidelink message was not decoded successfully, wherein the second set of data symbols are derived from the first set of data symbols, and wherein the third precoding vector is derived from the second precoding vector and the fourth precoding vector is derived from the first precoding vector.

Aspect 9: The method of aspect 8, further comprising: transmitting capability information to a wireless device, wherein receiving the second sidelink message comprising the second set of data symbols using a third precoding vector applied for the first layer and a fourth precoding vector applied for the second layer is based at least in part on transmitting the capability information.

Aspect 10: The method of aspect 9, wherein the capability information comprises an indication of whether the wireless device supports multiple input multiple output (MIMO), and receiving the second sidelink message comprising the second set of data symbols using a third precoding vector applied for the first layer and a fourth precoding vector applied for the second layer is based at least in part on whether the device supports MIMO.

Aspect 11: The method of any of aspects 8 through 10, wherein the first sidelink message has a rank of 2, the method further comprising: applying a channel matrix to the first sidelink message that reduces a rank of the first sidelink message to a rank of 1 to decode the second sidelink message.

Aspect 12: The method of any of aspects 8 through 11, wherein the third precoding vector is derived based at least in part on inverting a sign of the second precoding vector and conjugating the second precoding vector with the inverted sign, and the fourth precoding vector is derived based at least in part on conjugating the first precoding vector.

Aspect 13: The method of aspect 12, wherein the second set of data symbols are obtained by conjugating the first set of data symbols.

Aspect 14: The method of any of aspects 8 through 13, wherein the first sidelink message and the second sidelink message are associated with cellular vehicle to everything (CV2X) communications.

Aspect 15: An apparatus for wireless communication, comprising a processor; memory coupled with the processor; and instructions stored in the memory and executable by the processor to cause the apparatus to perform a method of any of aspects 1 through 7.

Aspect 16: An apparatus for wireless communication, comprising at least one means for performing a method of any of aspects 1 through 7.

Aspect 17: A non-transitory computer-readable medium storing code for wireless communication, the code comprising instructions executable by a processor to perform a method of any of aspects 1 through 7.

Aspect 18: An apparatus for wireless communication, comprising a processor; memory coupled with the processor; and instructions stored in the memory and executable by the processor to cause the apparatus to perform a method of any of aspects 8 through 14.

Aspect 19: An apparatus for wireless communication, comprising at least one means for performing a method of any of aspects 8 through 14.

Aspect 20: A non-transitory computer-readable medium storing code for wireless communication, the code comprising instructions executable by a processor to perform a method of any of aspects 8 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more memories; and
one or more processors coupled with the one or more memories and configured to cause the UE to:
transmit a first sidelink message comprising a first set of data symbols in accordance with a first precoding vector applied for a first layer and a second precoding vector applied for a second layer;
receive an indication that the first sidelink message was not decoded successfully; and
transmit a second sidelink message comprising a second set of data symbols in accordance with a third precoding vector applied for the first layer and a fourth precoding vector applied for the second layer based at least in part on the indication that the first sidelink message was not decoded successfully, wherein the second set of data symbols are derived from the first set of data symbols, and wherein the third precoding vector is derived from the second precoding vector and the fourth precoding vector is derived from the first precoding vector.

2. The apparatus of claim 1, wherein the one or more processors are further configured to cause the UE to:
receive capability information from a wireless device, wherein the transmission of the second sidelink message in accordance with the third precoding vector and the fourth precoding vector is based at least in part on the capability information.

3. The apparatus of claim 2, wherein:
the capability information comprises an indication of whether the wireless device supports multiple input multiple output (MIMO), and
the transmission of the second sidelink message in accordance with the third precoding vector and the fourth precoding vector is based at least in part on whether the wireless device supports MIMO.

4. The apparatus of claim 1, wherein the one or more processors are further configured to cause the UE to:
transmit a third sidelink message comprising the first set of data symbols in accordance with a fifth precoding vector applied for the first layer and a sixth precoding vector applied for the second layer; and
transmit a fourth sidelink message comprising the second set of data symbols in accordance with a seventh precoding vector applied for the first layer and an eighth precoding vector applied for the second layer, wherein the seventh precoding vector is derived from the sixth precoding vector and the eighth precoding vector is derived from the fifth precoding vector, and wherein the first sidelink message and the second sidelink message are associated with a first incremental redundancy version and the third sidelink message and the fourth sidelink message are associated with a second incremental redundancy version.

5. The apparatus of claim 1, wherein:
the third precoding vector is derived based at least in part on the second precoding vector with an inverted sign and conjugated, and
the fourth precoding vector is derived based at least in part on the first precoding vector conjugated.

6. The apparatus of claim 5, wherein the second set of data symbols are the first set of data symbols conjugated.

7. The apparatus of claim 1, wherein:
the first sidelink message and the second sidelink message are associated with cellular vehicle to everything (CV2X) communications.

8. An apparatus for wireless communication at a user equipment (UE), comprising:
one or more memories; and
one or more processors coupled with the one or more memories and configured to cause the UE to:
monitor for a first sidelink message comprising a first set of data symbols in accordance with a first precoding vector applied for a first layer and a second precoding vector applied for a second layer;
transmit an indication that the first sidelink message was not decoded successfully; and
receive a second sidelink message comprising a second set of data symbols in accordance with a third precoding vector applied for the first layer and a fourth precoding vector applied for the second layer based at least in part on the indication that the first sidelink message was not decoded successfully, wherein the second set of data symbols are derived from the first set of data symbols, and wherein the third precoding vector is derived from the second precoding vector and the fourth precoding vector is derived from the first precoding vector.

9. The apparatus of claim 8, wherein the one or more processors are further configured to cause the UE to:
transmit capability information to a wireless device, wherein receiving the second sidelink message comprising the second set of data symbols in accordance with the third precoding vector and the fourth precoding vector is based at least in part on the capability information.

10. The apparatus of claim 9, wherein:
the capability information comprises an indication of whether the apparatus supports multiple input multiple output (MIMO), and
receiving the second sidelink message comprising the second set of data symbols in accordance with the third precoding vector and the fourth precoding vector is based at least in part on whether the apparatus supports MIMO.

11. The apparatus of claim 8, wherein a rank of the first sidelink message corresponds to a rank of 2, and the one or more processors are further configured to cause the UE to:
apply a channel matrix to the first sidelink message that reduces the rank of the first sidelink message to a rank of 1 to decode the second sidelink message.

12. The apparatus of claim 8, wherein:
the third precoding vector is derived based at least in part on the second precoding vector with an inverted sign and conjugated, and
the fourth precoding vector is derived based at least in part on the first precoding vector conjugated.

13. The apparatus of claim 12, wherein the second set of data symbols are the first set of data symbols conjugated.

14. The apparatus of claim 8, wherein:
the first sidelink message and the second sidelink message are associated with cellular vehicle to everything (CV2X) communications.

15. A method for wireless communication, at a user equipment (UE), comprising:
transmitting a first sidelink message comprising a first set of data symbols in accordance with a first precoding vector applied for a first layer and a second precoding vector applied for a second layer;
receiving an indication that the first sidelink message was not decoded successfully; and
transmitting a second sidelink message comprising a second set of data symbols in accordance with a third precoding vector applied for the first layer and a fourth precoding vector applied for the second layer based at least in part on receiving the indication that the first sidelink message was not decoded successfully, wherein the second set of data symbols are derived from the first set of data symbols, and wherein the third precoding vector is derived from the second precoding vector and the fourth precoding vector is derived from the first precoding vector.

16. The method of claim 15, further comprising:
receiving capability information from a wireless device, wherein the transmission of the second sidelink message in accordance with the third precoding vector and the fourth precoding vector is based at least in part on receiving the capability information.

17. The method of claim 16, wherein:
the capability information comprises an indication of whether the wireless device supports multiple input multiple output (MIMO), and
the transmission of the second sidelink message in accordance with the third precoding vector and the fourth precoding vector is based at least in part on whether the wireless device supports MIMO.

18. The method of claim 15, further comprising:
transmitting a third sidelink message comprising the first set of data symbols in accordance with a fifth precoding vector applied for the first layer and a sixth precoding vector applied for the second layer; and transmitting a fourth sidelink message comprising the second set of data symbols in accordance with a seventh precoding vector applied for the first layer and an eighth precoding vector applied for the second layer, wherein the seventh precoding vector is derived from the sixth precoding vector and the eighth precoding vector is derived from the fifth precoding vector, and wherein the first sidelink message and the second sidelink message are associated with a first incremental redundancy version and the third sidelink message and the fourth sidelink message are associated with a second incremental redundancy version.

19. The method of claim 15, wherein;
the third precoding vector is derived based at least in part on inverting a sign of the second precoding vector and conjugating the second precoding vector with the inverted sign, and the fourth precoding vector is derived based at least in part on conjugating the first precoding vector.

20. The method of claim 19, wherein the second set of data symbols are obtained by conjugating the first set of data symbols.

21. The method of claim 15, wherein:
the first sidelink message and the second sidelink message are associated with cellular vehicle to everything (CV2X) communications.

22. A method for wireless communication, at a user equipment (UE), comprising:
monitoring for a first sidelink message comprising a first set of data symbols in accordance with a first precoding vector applied for a first layer and a second precoding vector applied for a second layer;
transmitting an indication that the first sidelink message was not decoded successfully; and
receiving a second sidelink message comprising a second set of data symbols in accordance with a third precoding vector applied for the first layer and a fourth precoding vector applied for the second layer based at least in part on the indication that the first sidelink message was not decoded successfully, wherein the second set of data symbols are derived from the first set of data symbols, and wherein the third precoding vector is derived from the second precoding vector and the fourth precoding vector is derived from the first precoding vector.

23. The method of claim 22, further comprising:
transmitting capability information to a wireless device, wherein receiving the second sidelink message comprising the second set of data symbols in accordance with the third precoding vector and the fourth precoding vector is based at least in part on the capability information.

24. The method of claim 23, wherein:
the capability information comprises an indication of whether the UE supports multiple input multiple output (MIMO), and
receiving the second sidelink message comprising the second set of data symbols in accordance with the third precoding vector and the fourth precoding vector is based at least in part on whether the UE supports MIMO.

25. The method of claim 22, wherein a rank of the first sidelink message corresponds to a rank of 2, the method further comprising:
applying a channel matrix to the first sidelink message that reduces the rank of the first sidelink message to a rank of 1 to decode the second sidelink message.

26. The method of claim 22, wherein:
the third precoding vector is derived based at least in part on the second precoding vector with an inverted sign and conjugated, and
the fourth precoding vector is derived based at least in part on the first precoding vector conjugated.

27. The method of claim 26, wherein the second set of data symbols are the first set of data symbols conjugated.

28. The method of claim 22, wherein:
the first sidelink message and the second sidelink message are associated with cellular vehicle to everything (CV2X) communications.

29. A non-transitory computer-readable medium storing code for wireless communication, the code comprising instructions executable by one or more processors to cause a user equipment (UE) to:
transmit a first sidelink message comprising a first set of data symbols in accordance with a first precoding vector applied for a first layer and a second precoding vector applied for a second layer;
receive an indication that the first sidelink message was not decoded successfully; and
transmit a second sidelink message comprising a second set of data symbols in accordance with a third precoding vector applied for the first layer and a fourth precoding vector applied for the second layer based at least in part on the indication that the first sidelink message was not decoded successfully, wherein the second set of data symbols are derived from the first set of data symbols, and wherein the third precoding vector is derived from the second precoding vector and the fourth precoding vector is derived from the first precoding vector.

30. A non-transitory computer-readable medium storing code for wireless communication, the code comprising instructions executable by one or more processors to cause a user equipment (UE) to:
monitor for a first sidelink message comprising a first set of data symbols in accordance with a first precoding vector applied for a first layer and a second precoding vector applied for a second layer;
transmit an indication that the first sidelink message was not decoded successfully; and
receive a second sidelink message comprising a second set of data symbols in accordance with a third precoding vector applied for the first layer and a fourth precoding vector applied for the second layer based at least in part on the indication that the first sidelink message was not decoded successfully, wherein the second set of data symbols are derived from the first set of data symbols, and wherein the third precoding vector is derived from the second precoding vector and the fourth precoding vector is derived from the first precoding vector.

* * * * *